US009005485B2

(12) United States Patent
Liu et al.

(10) Patent No.: US 9,005,485 B2
(45) Date of Patent: Apr. 14, 2015

(54) HIGH PERFORMANCE DIE ATTACH ADHESIVES (DAAS) NANOMATERIALS FOR HIGH BRIGHTNESS LED

(75) Inventors: Chenmin Liu, Hong Kong (HK); Dong Lu, Hong Kong (HK); Xianxin Lang, Hong Kong (HK); Bo Wang, Hong Kong (HK); Zhiying Li, Hong Kong (HK)

(73) Assignee: Nano and Advanced Materials Institute Limited, The Hong Kong University of Science and Technology, Clear Water Bay, Kowloon (HK)

( * ) Notice: Subject to any disclaimer, the term of this patent is extended or adjusted under 35 U.S.C. 154(b) by 0 days.

(21) Appl. No.: 13/821,566

(22) PCT Filed: Mar. 22, 2012

(86) PCT No.: PCT/CN2012/072843
§ 371 (c)(1),
(2), (4) Date: Mar. 8, 2013

(87) PCT Pub. No.: WO2012/126391
PCT Pub. Date: Sep. 27, 2012

(65) Prior Publication Data
US 2014/0001414 A1    Jan. 2, 2014

Related U.S. Application Data

(60) Provisional application No. 61/457,410, filed on Mar. 22, 2011.

(51) Int. Cl.
*H01B 1/22* (2006.01)
*C09J 9/02* (2006.01)
(Continued)

(52) U.S. Cl.
CPC ............... *C09J 9/02* (2013.01); *C08G 59/4042* (2013.01); *C08G 59/68* (2013.01); *C09J 163/00* (2013.01); *C08K 3/08* (2013.01)

(58) Field of Classification Search
CPC ............ C09J 163/00; C09J 9/02; C08K 3/08; C08L 63/00; B22F 1/00
USPC .............. 252/511, 519.21, 512, 513, 500, 514
See application file for complete search history.

(56) References Cited

U.S. PATENT DOCUMENTS 6,506,494 B2 *   1/2003   Brandys et al. ............ 428/402.2
7,013,965 B2     3/2006   Zhong et al.
(Continued)

FOREIGN PATENT DOCUMENTS

CN         101608052 A      12/2009
JP         2003335924 A1    11/2003
(Continued)

OTHER PUBLICATIONS

Inoue et al., "Temperature Dependence of Electrical and Thermal Conductivities of an Epoxy-Based Isotropic ConductiveAdhesive", J. Electron. Mater., vol. 37, No. 4 (2008) pp. 462-468.
(Continued)

*Primary Examiner* — Khanh Tuan Nguyen
*Assistant Examiner* — Danny N Kang
(74) *Attorney, Agent, or Firm* — Ella Cheong Hong Kong; Sam T. Yip

(57) ABSTRACT

The present invention relates to a composition for a one-part die attach adhesives material useful for packaging semi-conductors including HB-LED. The composition of the present invention includes a thermal and electrical conductive filler, a polymer matrix and a solvent which form a material with high thermal conductivity, low curing temperature and high self-life temperature. The present invention also relates to a method of preparing said composition by mixing a size-selected and surface-modified filler formulation, a polymer matrix and a non-reactive organic solvent together followed by curing the mixture at a low temperature.

16 Claims, 8 Drawing Sheets

(51) Int. Cl.
*C08G 59/40* (2006.01)
*C08G 59/68* (2006.01)
*C09J 163/00* (2006.01)
*C08K 3/08* (2006.01)

(56) References Cited

U.S. PATENT DOCUMENTS

| | | | |
|---|---|---|---|
| 7,081,214 B2 * | 7/2006 | Matsuba et al. | 252/512 |
| 7,094,843 B2 * | 8/2006 | Meyer | 525/481 |
| 7,108,806 B2 | 9/2006 | Xiao et al. | |
| 7,122,250 B2 * | 10/2006 | Kinsho et al. | 428/407 |
| 7,550,097 B2 | 6/2009 | Tonapi et al. | |
| 7,854,860 B2 | 12/2010 | Kondo et al. | |

FOREIGN PATENT DOCUMENTS

| | | | |
|---|---|---|---|
| JP | 2009001604 A * | 1/2009 | |
| WO | 2010018712 A1 | 2/2010 | |
| WO | WO 2010018712 A1 * | 2/2010 | |
| WO | 2011010659 A1 | 1/2011 | |

OTHER PUBLICATIONS

Li and Wong, "Recent advances of conductive adhesives as a lead-free alternative in electronic packaging: Materials, processing, reliability and applications", Materials Science and Engineering R 51 (2006) 1-35.

Lu et al., "Recent Advances in Nano-conductive Adhesives", Journal of Adhesion Science and Technology 22 (2008) 815-834.

Nan et al., "Interface effect on thermal conductivity of carbon nanotube composites", Appl. Phys. Lett., 85 (2004) 3549-3551.

Liu et al., "Thermal conductivity improvement of silicone elastomer with carbon nanotube loading", Appl. Phys. Lett. 84 (2004) 4248-4250.

Zhang et al., "Directly synthesizing CNT-TIM on aluminum alloy heat sink for HB-LED thermal management", Proc. 2008 ECTC 58th, pp. 1659-1663.

Zhang et al,, "Carbon nanotube thermal interface material for high-brightness light-emitting-diode cooling", Nanotechnology 19 (2008) 215706.

European Search Report of EP12760033.6 dated of Aug. 14, 2014.

* cited by examiner

HIGH PERFORMANCE DIE ATTACH ADHESIVES (DAAS) NANOMATERIALS FOR HIGH BRIGHTNESS LED

CROSS-REFERENCE TO RELATED APPLICATIONS

The present application claims priority of the U.S. provisional application No. 61/457,410 filed Mar. 22, 2011, the disclosure of which is incorporated herein by reference in its entirety.

FIELD OF INVENTION

The present invention relates to a high performance die attach adhesive ("DAA") material with high thermal conductivity, low curing temperature, and high shelf temperature by incorporating nanomaterials and micro/nano-capsule techniques. The present invention also relates to a method of preparing a composition for said material which is useful for packaging High Brightness LED ("HB-LED") and other semiconductor.

BACKGROUND OF INVENTION

HB-LEDs have gained greater importance in recent years and will become one of the most important products for the lighting industry in the near future. However, because conventional HB-LEDs have a common problem in generating heat flux which is higher than 100 W/cm$^2$, conventional packages designed for indicator LEDs are not suitable for HB-LEDs. Over-heating of an LED would cause premature failure because the efficiency, spectrum, reliability and life of the solid state lighting devices strongly depend on successful thermal management.

Epoxy adhesives are most commonly used in HB-LEDs and in semiconductor packaging because of their good adhesion to different kinds of substrates, ability to automate in ultra-rapid processes, low cost, and ease of use resulting in saving production cycle time, etc.

Unmodified epoxy polymeric resins are natural insulators and exhibit low electrical and thermal conductivity. Thus, appropriate fillers have been used to produce adhesives with high electrical and thermal conductivities. Sufficient electrical/thermal conductive particles should be added to form a network within the polymer matrix such that electrons and heat can flow across the particle contact points in order to make the mixture electrically and thermally conductive. Based on this concept, the thermal conductivity of a conventional die attach adhesive ("DAA") is mostly achieved by the fillers and the linkage between the fillers through the epoxy resin matrix [M. Inoue, H. Muta, S. Yamanaka, K. Suganuma, Osaka University, Japan, J. Electron. Mater., Vol. 37, No. 4 (2008) pp. 462-468.].

Metal powders, including silver, copper, gold, and aluminum etc., have been used as conventional DAA fillers to achieve a thermal conductivity of about 1-5 W/M·K. However, this thermal conductivity does not meet the current demands of high power devices. The design of filler materials as well as the chemistry between the filler and matrix had been actively studied [Yi Li, C. P. Wong, Materials Science and Engineering R 51, 2006, 1-35; D. D. Lu, Y. G. Li, C. P. Wong, 22, 2008, 801-834]. In addition, further research focuses on novel types of high thermally conductive fillers, including boron nitride, aluminum nitride, and carbon allotropes etc. [C.-W. Nan, G. Liu, Y. Lin, and M. Li, Appl. Phys. Lett., vol. 85, 2004, 3549-3551; C. H. Liu, H. Huang, Y. Wu, and S. S. Fan, Appl. Phys. Lett. 84, 2004, 4248-4250].

Attempts to enhance the thermal conductivity of the epoxy composite have also included the use of nanoparticle materials. For example, U.S. patent application Ser. No. 10/426,485 discloses the use of non-electrically conductive nanoparticles in a polymer matrix to improve the thermal conductivity of a polymer composite system. U.S. Pat. No. 7,550,097 also describes thermal conductive materials utilizing electrically conductive nanoparticles which show less phase separation than the micron-sized particles.

In addition to fillers, CVD grown carbon nanotubes (CNT) to serve as thermal interface materials (TIM) in HP (high-power)-LED (equivalent to HB-LED) packaging to enhance the thermal conductivity of the interface [K. Zhang, M. M. F. Yuen, D. G. W. Xiao, Y. Y. Fu, P. Chan, Proc. 2008 ECTC 58th, pp. 1659-1663; K. Zhang, Y. Chai, M. M. F. Yuen, D. G. W. Xiao, P. C. H. Chan, "Carbon nanotube thermal interface material for high-brightness light-emitting-diode cooling", Nanotechnology, 19, no. 215706]. However, as compared to the CNT-TIM used on heat-sink surfaces, the die bonding process in LED or other semiconductors still use die attach adhesives for bonding die/chip on different substrates (ceramic, silicon, copper, aluminum, etc). The unstable bonding between CNT-TIM and the die cannot provide enough strength for subsequent wire bonding processes. In contrast, a cured DAA is strong enough for such processes. This kind of cured DAA can link the most pivotal part, the LED die, and the substrate directly. Because of these characteristics, this kind of die attach material not only provides thermal and electrical conductivity between the die and the package but also essentially improves the performance of the device while operating in the field. The functionalized epoxy adhesives dominate the existing market share in mass production because of their good adhesion to different substrates, low cost and ability to automate in the bonding process.

As such, there is a need for developing a new DAA with higher thermal conductivity, better adhesion, and more mechanical stability. Until now, only a few DAAs have been reported which are able to reach a relatively high thermal conductivity of 15-25 W/M·K. DAAs with thermal conductivity of higher than 40 W/M·K with higher stability and relatively low in cost are still needed to form a reliable and stable HB-LED package.

Conventional epoxy adhesives are mostly composed of two initially separated parts: "A" is a linear polymer resin, and "B" is a curing agent. When the "A" part is mixed with "B" part, the linear polymer resin are activated by the curing agent and the linear molecules are cross linked to each other to form a final three-dimensional network. This kind of two-part adhesive has some advantages such as a very long shelf time and very low curing temperature curable at room temperature. However, their disadvantages in electronic devices packaging include an extra mixing process, short working life of the mixed adhesive resulting in a lot of wastes, and difficult application because when the two parts are mixed, they start curing right away at room temperature and the working life is too short which is not suitable for automatic die attach process.

In contrast, one-part epoxy adhesives are known for their versatility in different applications including electronic device packaging. They generally give outstanding adhesion to a wide range of substrates, very high bond strength and have excellent electrical properties. However, one-part epoxy adhesives have some limitations in electronic applications. Firstly, when a polymer resin and a curing agent are mixed together, very low shelf temperatures at ~−40° C. are needed to lower the reactivity. This makes the reaction mixture more costly and energy-consuming in transportation and storage. Secondly, latent curing agents are mostly used in one-part adhesive. As a result, most of the existing one-part epoxy adhesives need to be cured at a high temperature (≥150° C.) for a long time, which limits their use in LED devices with temperature sensitive parts such as LEDs. Such a cure condition is also a drawback from an energy saving and mass production efficiency point of view. Although some research work has focused on solving this problem by utilizing microencapsulated hardeners [U.S. Pat. No. 7,854,860], this kind of one-part material cannot be used in thermal/electrical conductive adhesives because the hard particle fillers in the adhesives destroy the soft microcapsule shells and the hardeners are being released resulting in the failure of the whole adhesive system. Thus, there remains a need in the art for improved epoxy systems having high thermal and electrical conductivity combined with ease of use, storage convenience, and the ability to form high strength bonds with a wide variety of substrate materials.

SUMMARY OF INVENTION

The first aspect of the present invention relates to one-part DAAs with high electric and thermal conductivities, low cure temperature and high shelf life temperature with high reliability. More specifically, the one-part DAAs have a thermal conductivity of ≥40 W/M·K, excellent curability at a temperature of ≤100° C., and high stability at a shelf temperature of ≥−10° C. A composition for the one-part DAAs of the present invention includes a thermal conductive filler of 30-96% by weight, a polymer matrix of 2-30% by weight, and a solvent of 2-40% by weight. The thermal conductive filler has good dispersion in the polymer matrix in order to enhance the thermal conductivity of the one-part DAAs of the present invention. The thermal conductive filler can be presented in different forms such as nanowires, nanowire networks or nanoparticles. The filler can be made of inorganic material(s) or metal(s) selected from silver, copper, nickel, graphite, or a combination thereof. The thermal conductive filler can also be modified into different size, shape, and/or percentage weight among the different kinds of filler to suit different purposes. The diameter of the filler ranges from 10 nm-50 μm, the shape of the filler can be particle-like, rod-like, network-like, etc.; the weight percentage of each kind of filler with different shape and size ranges from 1%-100% of the filler. The main function of the thermal conductive filler is to fill the gaps among commercial fillers to form a continuous and multichannel heat transmission pathway such that the thermal conductivity of the one-part DAAs of the present invention is enhanced. The thermal conductive filler additionally includes a dispersing agent. The weight percentage of the dispersing agent in the thermal conductive filler is between 0.1-10%. The dispersing agent of the present invention includes one or more of the followings: glycerin fatty acid and/or its polymers, organic silane coupling agents having hydrophilic groups and/or hydrophobic groups, organic titanates having hydrophilic groups and/or hydrophobic groups, and/or thiol-containing compounds with hydrophilic groups and/or hydrophobic groups.

The polymer matrix of the composition for the one-part DAAs of the present invention includes an epoxy system which is composed of an epoxy resin and a curing agent. The epoxy resin is selected from a chain aliphatic epoxy resin, cycloaliphatic epoxy resin, glycidyl ester, glycidyl ether compounds, or a combination thereof. The curing agent is selected from ammonium antimony hexafluoride, imidazole-containing compounds, or a combination thereof.

The solvent used in the composition for the one-part DAAs of the present invention includes one or more of the non-reactive organic diluents as defined herein.

The second aspect of the present invention relates to methods of using one-part DAAs in semiconductor packaging including HB-LED packaging. The methods of using the one-part DAAs of the present invention include a method of preparing a composition for the one-part DAAs which includes preparing a thermal conductive filler, preparing a polymer matrix, preparing a solvent, dispersing the thermal conductive filler in the polymer matrix to enhance the thermal conductivity of the one-part DAAs, adding a non-reactive organic solvent and dispersing agent into the mixture of the thermal conductive filler and the polymer matrix to facilitate the dispersing of the thermal conductive filler and lower the viscosity of the one-part DAAs, and providing a curing agent to an epoxy resin of the polymer matrix to control the curing behavior of the one-part DAAs. The surface of the thermal conductive filler used in the composition is further modified prior to the dispersing in the polymer matrix. The size, shape and weight percentage of different forms of the thermal conductive filler can also be modified prior to the dispersing in the polymer matrix. Different forms of the thermal conductive filler are separated and only the desired form is selected prior to the dispersing. The selected form of the thermal conductive filler after certain modification(s) is then dispersed in the polymer matrix in the presence of the non-reactive organic solvent. A dispersing agent is added to the selected form of the thermal conductive filler prior to the dispersing in the polymer matrix. The polymer matrix is prepared by mixing an epoxy resin with a curing agent. The curing process of the polymer matrix can be carried out by thermal cure, microwave cure, or a combination thereof. The curing process by thermal care or by a combination of the thermal, radiation and microwave cures can be performed at a temperature from about 20° C. to about 150° C. More specifically, the curing temperature is preferred to be from about 70° C. to 120° C. The curing process can last for about 1 minute to about 5 hours, more preferably is from 2 minutes to 2 hours. The method of preparing the composition for the one-part DAAs also includes mixing the selected thermal conductive filler, the solvent and the polymer matrix to form the composition for the one-part DAAs of the present invention. The mixing can be performed by hand-mixing or by other mixing equipments such as dough mixers, chain can mixers, planetary mixers, twin screw extruder, two or three roll mills, or by any conventional means known to a person skilled in the art. In any of the mixing steps of the method of preparing the composition for the one-part DAAs, the components at each mixing step can be blended in batch, continuous, or semi-continuous mode by any means that know to a person skilled in the art.

DETAILED DESCRIPTION OF INVENTION

Figure 1:
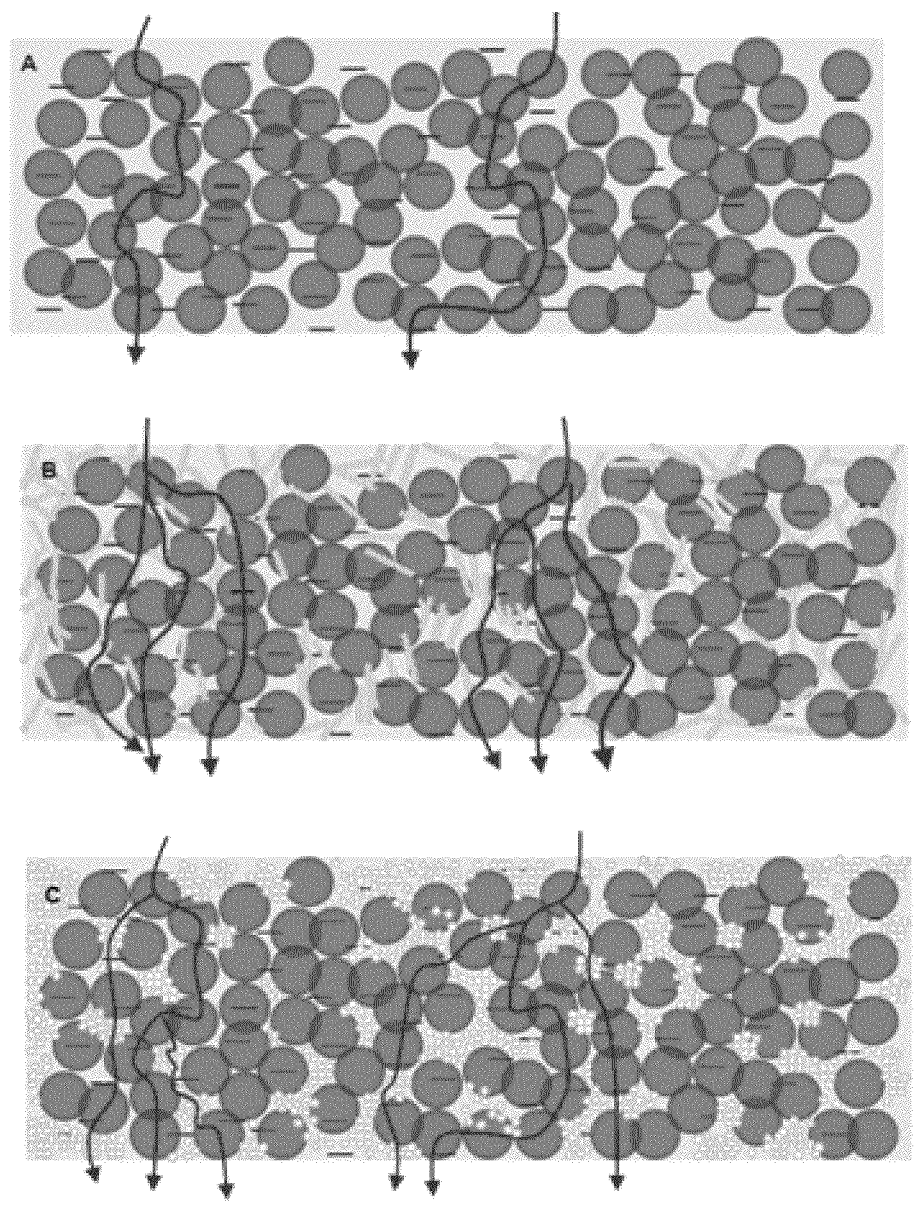
FIG. 1 is a schematic illustration of the heat dissipation route in a DAAs system under different conditions: (1A) before, (1B) after adding a rod-shaped filler, and (1C) after adding nano-sized particle-like filler.

Turning to the drawings in details, FIG. 1 shows the difference in heat dissipation between compositions having no filler, having micron-sized/nano-sized rod-shaped filler and having the particle-like filler of the present invention. Before adding the thermal conductive filler of the present invention, heat is dissipated through a particle-particle contact route and the heat dissipation path is long and twisted (as shown in FIG. 1A). However, after adding the thermal conductive nanowires or nanorods (as shown in FIG. 1B), or nano-particle (as shown in FIG. 1C) filler, these thermal conductive fillers can fill the gaps among the large particles in a DAAs system and form many shortcuts among these particles to facilitate heat dissipation, thus result in a continuous, direct, and multichannel heat dissipation pathway (the arrows as shown in FIG. 1B and FIG. 1C). Therefore, the thermal conductivity of the whole DAAs system is increased significantly by the incorporation of the thermal conductive filler of the present invention.

Figure 2:
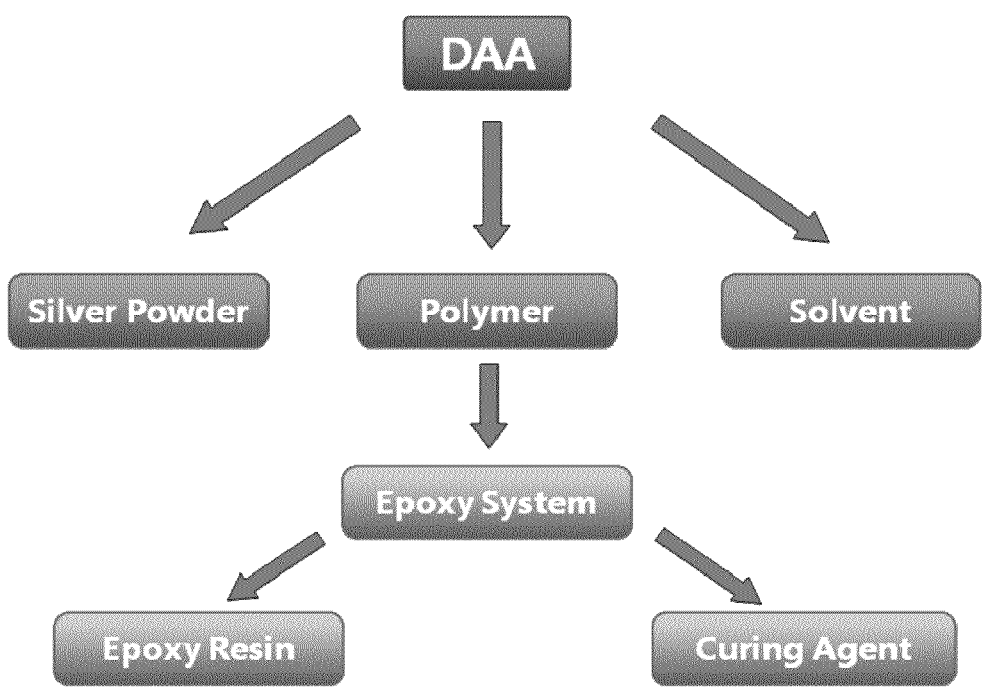
FIG. 2 is a schematic illustration of the key components in a composition forming the one-part DAAs of the present invention.

The basic components of the one-part DAAs of the present invention are shown in FIG. 2. The three basic components in the one-part DAAs are: (i) a surface-modified thermal conductive filler which is mainly responsible for the enhancement of thermal conductivity, preferably silver-based filler, where the thermal conductive filler is also electrically conductive; (ii) a polymer formulation which are responsible for controlling the curing behavior of the one-part DAAs, where the polymer formulation includes an epoxy system which is composed of two parts: epoxy resin and a curing agent; and (iii) a solvent which disperses the surface-modified fillers lowers the viscosity of the whole DAAs system.

Figure 3:
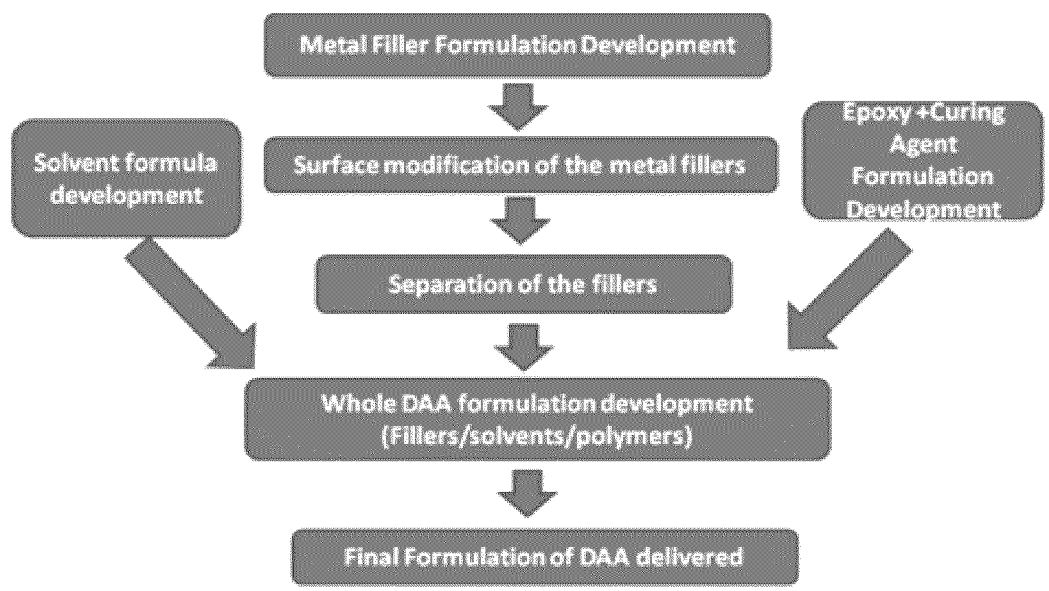
FIG. 3 is a flowchart depicting the formation scheme of a composition for the one-part DAAs of the present invention.

A flowchart demonstrating how these three basic components can form a composition for the one-part DAAs of the present invention is illustrated in FIG. 3. The composition for the one-part DAAs is prepared by: (i) preparing a filler formulation and modifying the surface of the filler particles to form a thermal conductive filler; (ii) preparing a polymer matrix; (iii) preparing a solvent; and (iv) mixing the surface-modified thermal conductive filler, polymer matrix and solvent to result in the final composition for the one-part DAAs of the present invention.

The thermal conductive filler of the present invention includes an inorganic compound of 30-96% by weight in the composition for the one-part DAAs of the present invention. More preferably, the thermal conductive filler is selected from silver, copper, nickel, graphite, or a combination thereof.

In one embodiment, about 20-100% by weight of the filler formulation are particles with a diameter of about 13-50 μm, about 10-100% by weight are particles with a diameter of about 6-12 μm, about 10-90% by weight are particles with a diameter of about 5-6 μm, about 20-100% by weight are particles with a diameter of about 1-5 μm, and about 1-10% by weight are nano-sized particles with a diameter of about 10-200 nm, and/or about 1-10% by weight are nanorods with a diameter of about 100 nm-1 μm and a length of 1-10 μm.

In a more preferred embodiment, the filler particles of the present invention are in a diameter of about 10-200 nm. In an exemplary embodiment, the filler particles are in a diameter of about 10-100 nm.

Figure 4:
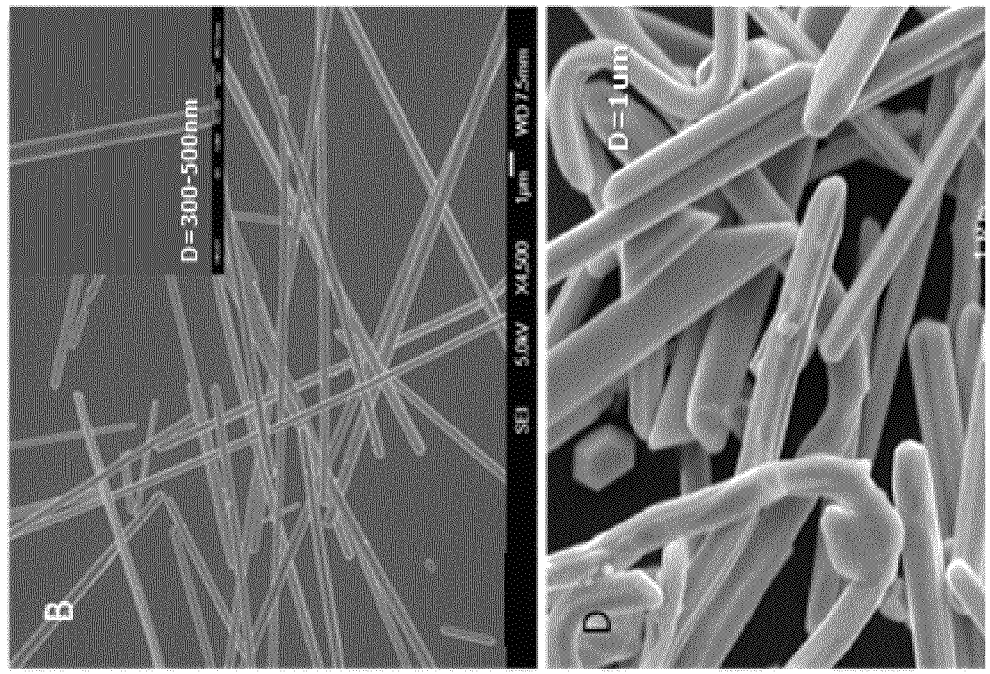
FIG. 4 is a series of micrographs showing the morphology of a rod-like filler made of silver in different diameters: (4A) 100-200 nm, (4B) 300-500 nm; (4C) 600-700 nm; and (4D) ~1 μm.
Figure 4:
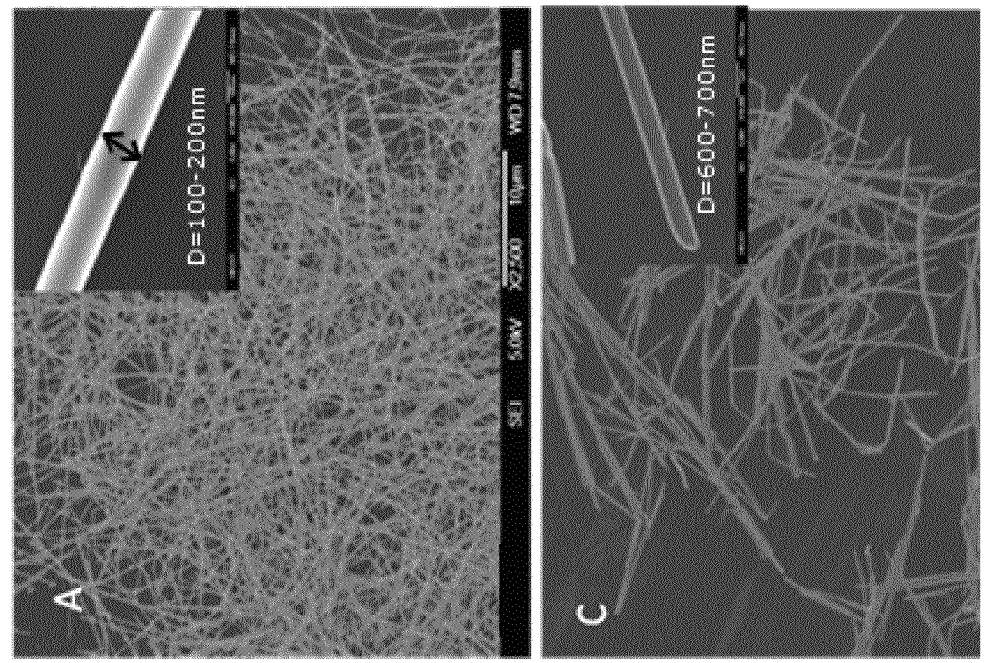

FIG. 4 is micrograph showing silver-based nanorods with different diameters which follows the manufacturing method disclosed by Cao et al., Guo et al and Liu et al. [Y. Cao et al. J. Phys. D: Appl. Phys. 38, 2005, 1061-1067; L. Guo et al. J. Am. Chem. Soc., 2004, 126, 4530-453; C. Liu et al., Microelectronic Engineering 2003, 66, 107-114]. The thermally and electrically conductive nanorods of the present invention are in a diameter ranging from 100 nm-1 μm. In an exemplary embodiment, the nanorods are in a diameter ranging from 100 nm to 500 nm.

In another embodiment, the thermal conductive filler is a micron-sized particle in a size of about 1-50 μm. The size selection of the filler particles is dependent on the targeted bond line thickness of where the filler is to be used, typically about 5-150 μm of the bond line thickness. The desired filler particles should have a dimension less than the targeted bond line thicknessin which the filler is to be used.

Different sizes and/or shapes of the thermal conductive filler of the present invention can be used alone or in combination in the composition for the one-part DAAs of the present invention.

To facilitate dispersing the thermal conductive filler in the polymer matrix of the present invention, the filler particles are additionally treated with a dispersing agent to create surface-modified filler particles. The dispersing agent includes one or more of the following compounds: at least one of glycerin fatty acid esters or their polymers, organic silane coupling agents having hydrophilic groups and/or hydrophobic groups, organic titanates having hydrophilic groups and/or hydrophobic groups, or thiol-containing molecules with hydrophilic groups and/or hydrophobic groups in 0.1-10% by weight of the whole filler.

The composition for the one-part DAAs of the present invention also includes a polymer matrix of about 2-30% by weight in the composition. The polymer matrix includes an epoxy system which is composed of (i) epoxy resin of about 10-90% by weight selected from chain aliphatic epoxy resin, cycloaliphatic epoxy resin, glycidyl ester, or glycidyl ether compounds, or a combination thereof; and (ii) a curing agent of 10-90% by weight selected from amine, cationic polymerization catalysts, dicyandiamide, or modified imidazole group compound, phosphines, metal salts, and combinations thereof. In a specific embodiment, the epoxy resin is epoxy-cyclohexanecarboxylate. In another specific embodiment, the curing agent is ammonium antimony hexafluoride.

The composition for the one-part DAAs of the present invention also includes one or more solvents. The one or more solvents in an amount of about 2-40% by weight are selected from toluene, xylene, propylene carbonate, mixed aliphatic dimethyl esters, diethylene glycol monomethyl ether acetate, dimethyl carbonate, diethylene carbonate, acetone, methyl ethyl ketone, methyl isobutyl ketone, ethanol, isopropanol, n-butanol, ethyl acetate, or a combination thereof. The solvent can also serve as a non-reactive organic diluent and be additionally added to the composition to decrease the viscosity of the composition.

The final composition can be hand mixed or mixed by standard mixing equipment, such as dough mixers, chain can mixers, planetary mixers, twin screw extruder, two or three roll mill and the like. The blending of the components of the composition can be performed in batch, continuous, or semi-continuous mode by any means used by those skilled in the art.

The curing process can be performed by any process know to those skilled in the art. Curing can be done be methods such as thermal cure, radiation cure, microwave cure, and combination thereof. Curing typically occurs at at temperature in a range between about 20° C. and about 150° C. In addition, curing may typically occur over a period in a range between about 1 minute and about 5 hours, and more typically in a range between about 2 minutes and about 120 minutes. Preferably, the curing temperature in a range between 70° C. and 120° C. is used.

In any of the mixing of the method of preparing the composition for the one-part DAAs, the components at each mixing can be blended in batch, continuous, or semi-continuous mode by any means that know to a person skilled in the art.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention, these descriptions should not be viewed in a limiting sense. Rather, there are several variations and modifications which may be made without departing from the scope of the present invention as defined in the appended claims.

EXAMPLES

Example 1

Surface Modification to Form Well-Dispersed Inorganic Fillers Using Organo-Silane About 10 g of inorganic fillers were firstly added into about 100 mL of ethyl alcohol to form a first solution. Then about 5 mL of γ-Glycidoxypropyl trimethoxysilane was introduced into the first solution where silver particles are used as filler to form a second solution. The second solution was electromagnetically stirred for 2 hours to ensure a surface monolayer coverage of the dispersing agent on the particle surface is formed. After modification, the fillers were dried at 110° C. for at least 1 hour and re-dispersed in a solvent (n-butanol is used in this example).

Example 2

Surface Modification to Form Well-Dispersed Inorganic Fillers Using Thiol Containing Compound About 10 g of the inorganic fillers were firstly added into about 100 mL of ethyl alcohol (100 mL) to form a first solution. Then about 0.05 g of 3,3,4,4,5,5,6,6,7,7,8,8,9,9,10,10,10-heptadecafluoro-1-decanethiol was introduced into the first solution where silver particles are used as the fillers to form a second solution. The second solution was electromagnetically stirred for 1 hour to ensure a surface monolayer coverage of the dispersing agent on the particle surface is formed. After modification, the fillers were washed with ethyl alcohol 3 times and then dried at room temperature for at least 1 hour and re-dispersed in a solvent (n-butanol is used in this example).

Example 3

Graded Size Formula of Inorganic Fillers with Good Fluidity

Fluidity is a measure of the dispersion properties of the filler. Highly dispersible metal fillers were prepared in the same manner as in Example 1 or Example 2 and the fillers are composed of the graded particles with the sizes shown in the following table:

TABLE 1

The Examples Of Inorganic Filler Compositions With Good Fluidity

| Sample No. | Particle Sizes | Ratios of different sizes (weight %) |
| --- | --- | --- |
| I | 16-18 μm:12-16 μm:10-12 μm:2.1-3.5 μm:1.4-2.1 μm:50-100 nm nanoparticles | 10:20:20:25:20:5 |
| II | 16-18 μm:12-16 μm:10-12 μm:5-7 μm:50-100 nm nanoparticles | 10:20:20:47:3 |
| III | 16-18 μm:12-16 μm:10-12 μm:5-7 μm:7-8 μm:nanorods with diameters of 100 nm and length of ~2 μm | 2:3:5:40:48:2 |
| IV | 5-7 μm:7-8 μm:nanorods with diameters of 100 nm and length of ~2 μm | 48:48:4 |

It is noted that the fluidity of the fillers in the solvent was substantially increased after graded sizes formulation and surface modification procedure, which enables homogeneous dispersion to form adhesives with good thermal and electrical conductivities.

Example 4

Polymer Formulation for Low Curing Temperature at 80° C.

Figure 5:
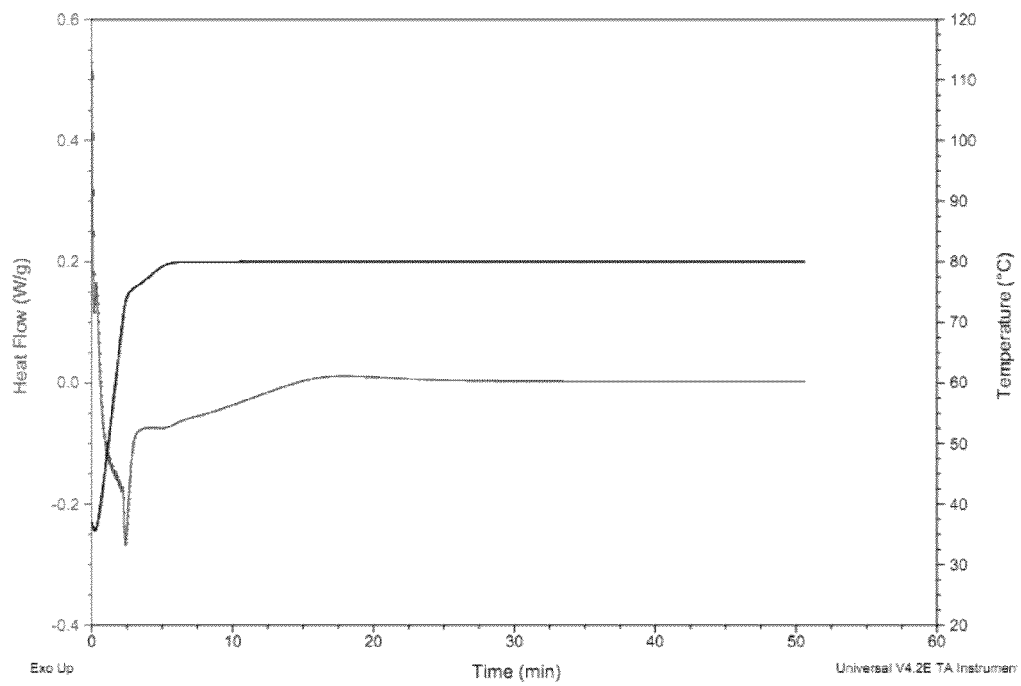
FIG. 5 is a DSC spectrum of the epoxy formulation as described in Example 4.

A heat curable resin formulation was prepared by uniformly mixing 87.5 parts of 3,4-epoxycyclohexylmethyl-3',4'-epoxycyclohexanecarboxylate and 12.5 parts of ammonium antimony hexafluoride. The resulting heat-curable resin formulation was evaluated for the curability by measuring Differential Scanning calorimetry (DSC) spectrum of the products and the relevant result is shown in FIG. 5. The epoxy system can be fully cured at 80° C. within 20 minutes.

Example 5

Polymer Formulation for Low Curing Temperature at 100° C.

Figure 6:
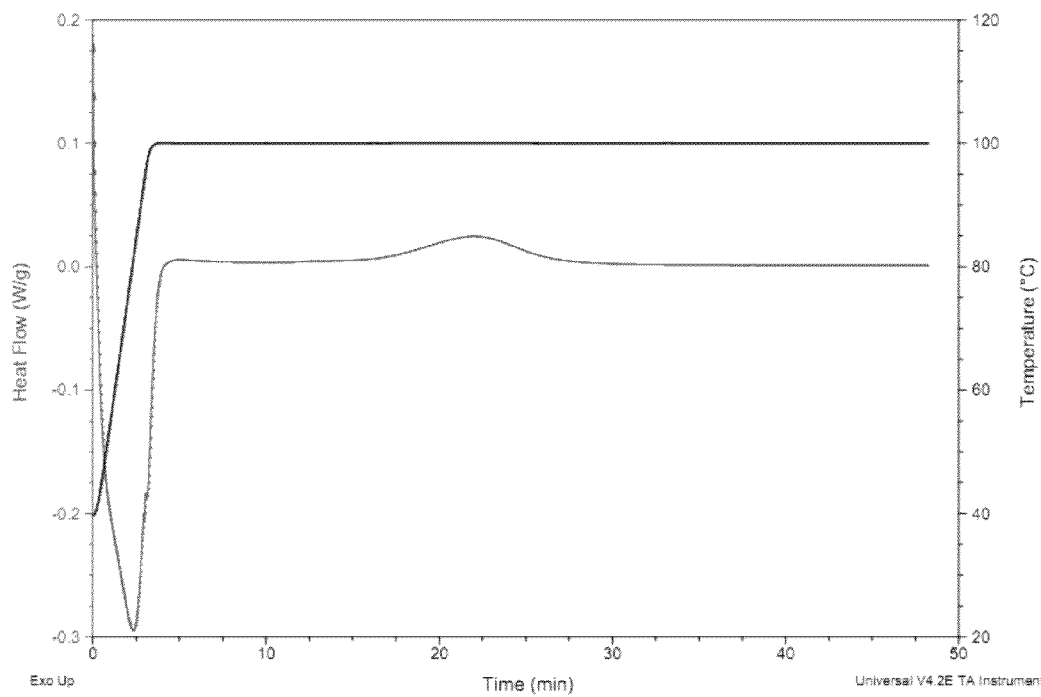
FIG. 6 is a DSC spectrum of the epoxy formulation as described in Example 5.

A heat curable resin formulation was prepared in the same manner as that in Example 4 except for using 50 parts of Bisphenol A, 20 parts of poly ethoxylated polyglyceryl ester, and 30 parts of 1-Cyanoethyl-2-ethyl-4-Methylimidazole, and evaluated for curability, the relevant DSC is shown in FIG. 6, which demonstrates that this formula can be cured at 100° C. within 10 minutes.

Example 6

DAA Composition with High Thermal Conductivity of ≥40 W/M·K, Low Curing Temperature at 80° C. and Shelf Life Temperature at −10° C.

Before mixing the fillers with the polymer matrix, the fillers were dispersed in excess amount of n-butanol and ultrasonically dispersed for 30 minutes followed by separation by centrifuge and then vacuum dried under 100° C. for 1 hour.

Figure 7:
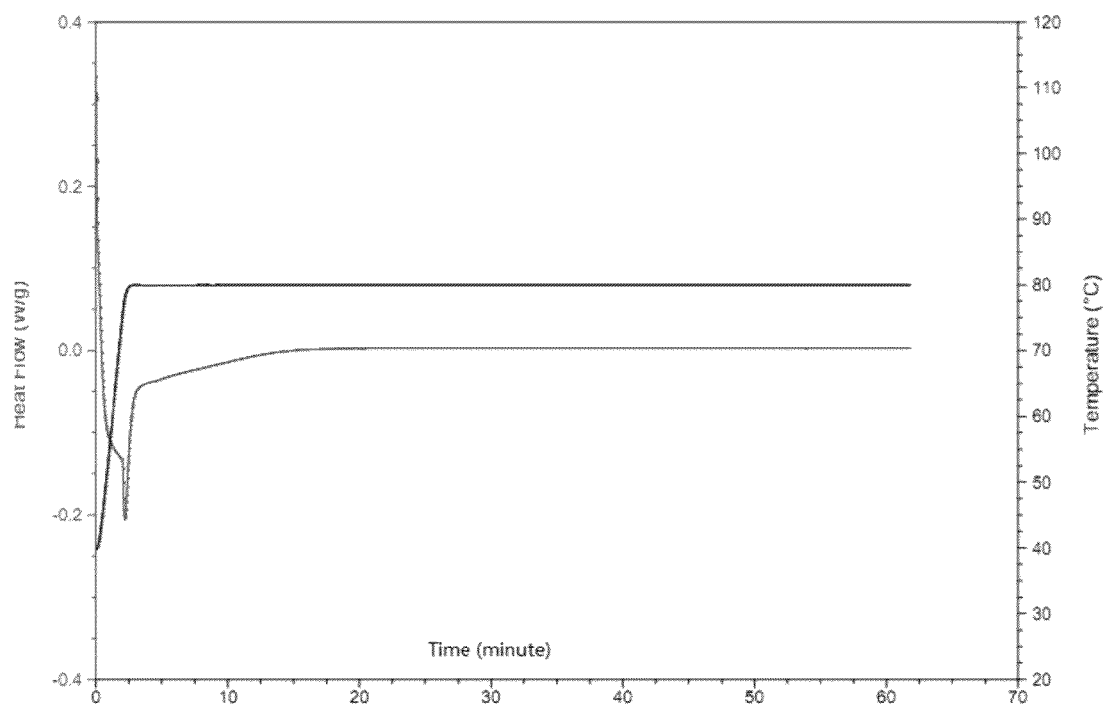
FIG. 7 is a DSC spectrum of the epoxy formulation as described in Example 6.

A heat curable resin formulation was prepared by uniformly mixing 90 parts of the surface-modified filler as described in Example 3 (sample I-IV in Table 1), 6.6 parts of the polymer formulation as described in Example 4, and 3.4 parts of n-butanol to form a DAA composition. The composition was then evaluated for the curability, the relevant DSC is shown in FIG. 7. The DAA composition can be fully cured within 20 minutes at 80° C.

To test the thermal conductivity of the DAAs, the slurry-like DAA composition was poured to a Poly-tetrafluoro-ethylene (PTFE) mould with a diameter of ~12.7 mm and then heated at 80° C. for one hour. Then the cured DAA pad was taken out from the mould and tested thermal conductivity using a Flashline 3000 thermal conductivity testing system. The relative testing results are shown in Table 2.

TABLE 2

Thermal Conductivity Testing Results of Example 6

| Sample No. | Particle Sizes | Ratios of different sizes (weight %) | Polymer Formulation | Thermal Conductivity (W/M · K) |
|---|---|---|---|---|
| Example 6(I) | 16-18 μm:12-16 μm:10-12 μm:2.1-3.5 μm:1.4-2.1 μm:50-100 nm nanoparticles | 10:20:20:25:20:5 | Example 4 | 41.95 |
| Example 6(II) | 16-18 μm:12-16 μm:10-12 μm:5-7 μm:50-100 nm nanoparticles | 10:20:20:47:3 | Example 4 | 39.50 |
| Example 6(III) | 16-18 μm:12-16 μm:10-12 μm:5-7 μm:7-8 μm:nanorods with diameters of 100 nm and length of ~2 μm | 2:3:5:40:48:2 | Example 4 | 28.16 |
| Example 6(IV) | 5-7 μm:7-8 μm:nanorods with diameters of 100 nm and length of ~2 μm | 48:48:4 | Example 4 | 26.75 |

Example 7

DAA Composition with High Thermal Conductivity of ≥40 W/M·K, Low Curing Temperature at 100° C., and Shelf Life Temperature at −10° C.

Figure 8:
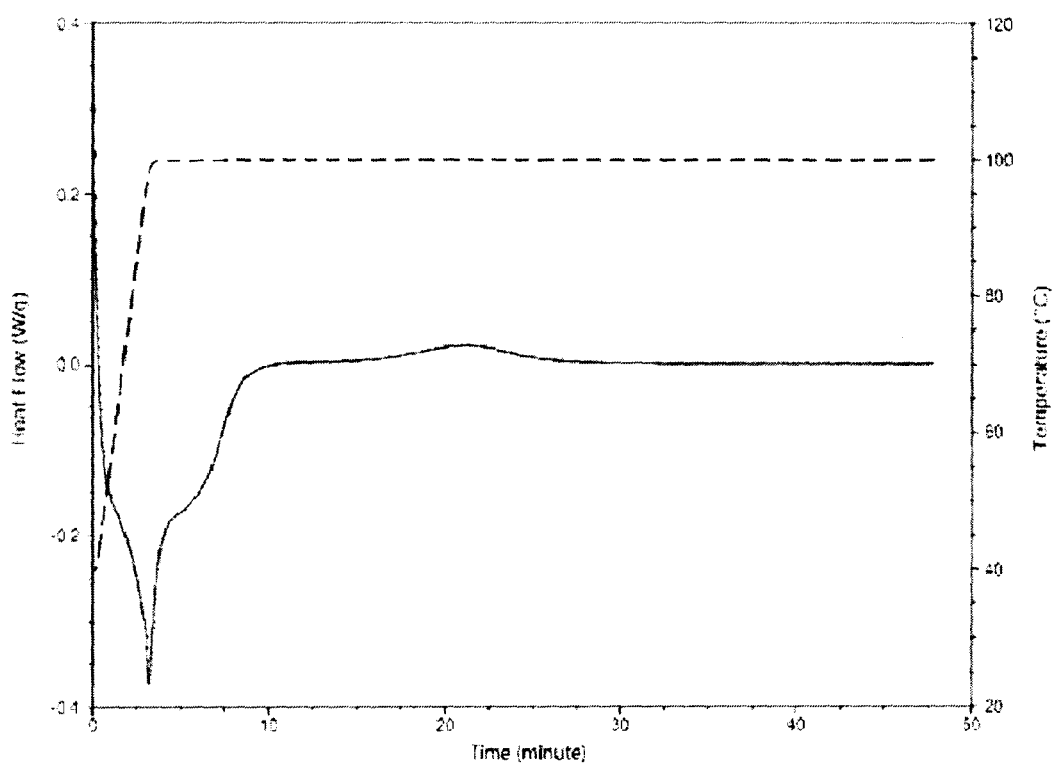
FIG. 8 is a DSC spectrum of the epoxy formulation as described in Example 7

A heat-curable resin composition was prepared in the same manner as in Example 6 except for 90 parts of the products as described in Example 3 (sample I-IV in Table 1), 6.6 parts of the products as described in Example 5, and 3.4 parts of n-butanol were combined to form a DAA composition and the composition was evaluated for its curability. The relevant DSC is shown in FIG. 8. The DAA composition can be fully cured within 20 minutes at 100° C. The relative thermal conductivity testing results are shown in Table 3.

TABLE 3

Thermal conductivity testing results of Example 7

| Sample No. | Particle Sizes | Ratios of different sizes (weight %) | Polymer Formulation | Thermal Conductivity (W/M · K) |
|---|---|---|---|---|
| Example 7(I) | 16-18 μm:12-16 μm:10-12 μm:2.1-3.5 μm:1.4-2.1 μm:50-100 nm nanoparticles | 10:20:20:25:20:5 | Example 5 | 51.75 |
| Example 7(II) | 16-18 μm:12-16 μm:10-12 μm:5-7 μm:50-100 nm nanoparticles | 10:20:20:47:3 | Example 5 | 43.17 |
| Example 7(III) | 16-18 μm:12-16 μm:10-12 μm:5-7 μm:7-8 μm:nanorods with diameters of 100 nm and length of ~2 μm | 2:3:5:40:48:2 | Example 5 | 31.49 |

TABLE 3-continued

Thermal conductivity testing results of Example 7

| Sample No. | Particle Sizes | Ratios of different sizes (weight %) | Polymer Formulation | Thermal Conductivity (W/M · K) |
|---|---|---|---|---|
| Example 7(IV) | 5-7 µm:7-8 µm:nanorods with diameters of 100 nm and length of ~2 µm | 48:48:4 | Example 5 | 30.14 |

INDUSTRIAL APPLICABILITY

The present invention is applicable in various packaging industries such as packaging HB-LED and other electronic devices or semi-conductors. The high performance die attach adhesives (DAAs) materials can also be used in any products that require good heat dissipation or thermal conductivity.

What we claim are:

1. A method of preparing a one-part and heat-curable die attach adhesive (DAA) composition comprising:
providing a thermally and electrically conductive filler;
providing a polymer matrix;
providing a solvent; and
mixing the thermally and electrically conductive filler, the polymer matrix and the solvent to form the composition,
wherein said filler is an inorganic compound with 30-96% by weight of the composition, said inorganic filler being further modified prior to said mixing to form a modified filler formulation to improve fluidity of said filler in the solvent, and said modified filler formulation having different graded sizes of the filler comprising:
microparticles having a diameter of about 13-50 µm in about 20-100% by weight of said inorganic filler,
microparticles having a diameter of about 6-12 µm in about 10-100% by weight of said inorganic filler,
microparticles having a diameter of about 5-6 µm in about 10-90% by weight of said inorganic fillers,
microparticles having a diameter of about 1-5 µm in about 20-100% by weight of said inorganic filler,
nanoparticles having a diameter of about 10-200 nm in about 1-10% by weight of said inorganic filler, and/or nanorods having a diameter of about 100 nm-1 µm and a length of about 1-10 µm in 1-10% by weight of said inorganic filler; and
wherein the nanoparticles and/or the nanorods fill gaps among the microparticles to form shortcuts, resulting in continuous, direct and multichannel dissipation pathways to facilitate heat dissipation;
wherein the surface of said inorganic filler is further modified by a dispersing agent comprising at least one of glycerin fatty acid esters or their polymers, organic silane coupling agents having hydrophilic groups and/or hydrophobic groups, organic titanates having hydrophilic groups and/or hydrophobic groups, thiol containing molecules with hydrophilic groups and/or hydrophobic groups, or a combination thereof for facilitating dispersing the inorganic filler into the polymer matrix, and wherein said dispersing agent is about 0.1-10% by weight of said inorganic filler;
wherein after modifying the surface of the inorganic filler and mixing the thermally and electrically conductive filler, the polymer matrix and the solvent to form the DAA composition with said modified filler formulation having different graded sizes of the modified filler, the fluidity of the fillers in the solvent is improved, enabling homogeneous dispersion of the filler to form the adhesive with high thermal conductivity;
wherein said polymer matrix is 2-30% by weight of the DAA composition;
said solvent is 2-40% by weight of the DAA composition;
wherein said thermal conductivity is at least 40 W/M·K, and curing temperature of the DAA composition is about 80-100° C.; and
wherein the modified filler formulation is further re-dispersed in a solvent selected from toluene, xylene, propylene carbonate, mixed aliphatic dimethyl esters, diethylene glycol monomethyl ether acetate, dimethyl carbonate, diethylene carbonate, acetone, methyl ethyl ketone, methyl isobutyl ketone, ethanol, isopropanol, n-butanol, ethyl acetate, or a combination thereof, and wherein an ultrasonic probe is applied after re-dispersing the modified filler formulation in said solvent, followed by size separation by centrifuge and then vacuum drying the selected filler under a temperature ranging from about 60-150° C. for 10 minutes to 3 hours.

2. The method of claim 1, wherein the inorganic filler is selected from gold, silver, copper, nickel, graphite, or a combination thereof.

3. The method of claim 1, wherein said polymer matrix consists of epoxy resin of 10-90% by weight and a curing agent of 10-90% by weight, and wherein said epoxy resin is one or more selected from chain aliphatic epoxy resin, cycloaliphatic epoxy resin, glycidyl ester, or glycidyl ether compounds; and said curing agent is one or more selected from amine, cationic polymerization catalysts, dicyandiamide, or modified imidazole group compound, phosphines, or metal salts.

4. The method of claim 1, wherein said solvent is one or more selected from toluene, xylene, propylene carbonate, mixed aliphatic dimethyl esters, diethylene glycol monomethyl ether acetate, dimethyl carbonate, diethylene carbonate, acetone, methyl ethyl ketone, methyl isobutyl ketone, ethanol, Isopropanol, n-butanol, or ethyl acetate.

5. The method of claim 1, wherein said mixing of the thermally and electrically conductive filler, the polymer matrix and the solvent is performed by hand mixing or one or more of mixing equipment selected from dough mixers, chain can mixers, planetary mixers, twin screw extruder, two or more roll mills, and wherein said providing additionally includes independently blending said thermally and electrically conductive filler, said polymer matrix, and said solvent in batch, continuous, or semi-continuous mode.

6. A one-part and heat curable die attach adhesive (DAA) composition formed by the method of claim 1.

7. The method of claim 1, wherein the dispersing agent is γ-Glycidoxypropyl trimethoxysilane.

8. The method of claim 1, wherein the dispersing agent is 3,3,4,4,5,5,6,6,7,7,8,8,9,9,10,10,10-heptadecafluoro-1-decanethiol.

9. A method of preparing a one-part and heat-curable die attached adhesive (DAA) composition comprising:
providing a silver filler;
providing a polymer matrix comprising 87.5 parts of 3,4-epoxycyclohexylmethyl-3',4'-epoxycyclohexanecarboxylate and 12.5 parts of ammonium antimony hexafluoride;
providing a solvent; and
mixing the silver filler, the polymer matrix and the solvent to form the DAA composition,
wherein the silver filler comprises with 30-96% by weight of the composition, and the silver being further modified prior to said mixing to form a modified filler formulation to improve fluidity of the silver filler in the solvent, and said modified filler formulation having different graded sizes of the silver filler comprising:
microparticles having a diameter of about 16-18 μm in about 10% by weight of the silver filler;
microparticles having a diameter of about 12-16 μm in about 20% by weight of the silver filler;
microparticles having a diameter of about 10-12 μm in about 20% by weight of the silver filler;
microparticles having a diameter of 2.1-3.5 μm in about 25% by weight of the silver filler;
microparticles having a diameter of 1.4-2.1 μm in about 20% by weight of the silver filler;
nanoparticles having a diameter of about 20-100 nm in about 5% by weight of the silver filler; and
wherein the nanoparticles fill gaps among the microparticles to form shortcuts, resulting in continuous, direct and multichannel dissipation pathways to facilitate heat dissipation;
wherein the surface of said inorganic filler is further modified by a dispersing agent including γ-Glycidoxypropyl trimethoxysilane for facilitating dispersing the silver filler into the polymer matrix, and wherein said dispersing agent is about 0.1-10% by weight of said inorganic filler;
wherein after modifying the surface of the silver filler and mixing the silver filler, the polymer matrix and the solvent to form the composition with said modified filler formulation having different graded sizes of the modified silver filler, the fluidity of the silver filler in the solvent is improved, enabling homogeneous dispersion of the filler to form the adhesive with high thermal conductivity;
wherein said polymer matrix is 2-30% by weight of the DAA composition; said solvent is 2-40% by weight of the DAA composition; and
wherein said composition is formed with thermal conductivity of at least about 40 W/M·K, and curing temperature of about 80° C.

10. A method of preparing a one-part and heat-curable die attached adhesive (DAA) composition comprising:
providing a silver filler;
providing a polymer matrix comprising 50 parts of bisphenol A, 20 parts of poly ethoxylated polyglyceryl ester, and 30 parts of 1-cyanoethyl-2-ethyl-4-methylimidazole;
providing a solvent; and
mixing the silver filler, the polymer matrix and the solvent to form the composition,
wherein the silver filler comprises with 30-96% by weight of the composition, and the silver being further modified prior to said mixing to form a modified filler formulation to improve fluidity of the silver filler in the solvent, and said modified filler formulation having different graded sizes of the silver filler comprising:
microparticles having a diameter of about 16-18 μm in about 10% by weight of the silver filler;
microparticles having a diameter of about 12-16 μm in about 20% by weight of the silver filler;
microparticles having a diameter of about 10-12 μm in about 20% by weight of the silver filler;
microparticles having a diameter of 2.1-3.5 μm in about 25% by weight of the silver filler;
microparticles having a diameter of 1.4-2.1 μm in about 20% by weight of the silver filler;
nanoparticles having a diameter of about 20-100 nm in about 5% by weight of the silver filler; and
wherein the nanoparticles fill gaps among the microparticles to form shortcuts, resulting in continuous, direct and multichannel dissipation pathways to facilitate heat dissipation;
wherein the surface of said inorganic filler is further modified by a dispersing agent including 3,3,4,4,5,5,6,6,7,7,8,8,9,9,10,10,10-heptadecafluoro-1-decanethiol for facilitating dispersing the silver filler into the polymer matrix, and wherein said dispersing agent is about 0.1-10% by weight of said inorganic filler;
wherein after modifying the surface of the silver filler and mixing the silver filler, the polymer matrix and the solvent to form the DAA composition with said modified filler formulation having different graded sizes of the modified silver filler, the fluidity of the silver filler in the solvent is improved, enabling homogeneous dispersion of the filler to form the adhesive with high thermal conductivity;
wherein said polymer matrix is 2-30% by weight of the DAA composition; said solvent is 2-40% by weight of the DAA composition; and
wherein said thermal conductivity is at least 40 W/M·K, and curing temperature of the composition is about 100° C.

11. A method of preparing a one-part and heat-curable die attach adhesive (DAA) composition comprising:
providing a thermally and electrically conductive filler;
providing a polymer matrix;
providing a solvent; and
mixing the thermally and electrically conductive filler, the polymer matrix and the solvent to form the composition,
wherein said filler is an inorganic compound with 30-96% by weight of the composition, said inorganic filler being further modified prior to said mixing to form a modified filler formulation to improve fluidity of said filler in the solvent, and said modified filler formulation having different graded sizes of the filler comprising:
microparticles having a diameter of about 13-50 μm in about 20-100% by weight of said inorganic filler,
microparticles having a diameter of about 6-12 μm in about 10-100% by weight of said inorganic filler,
microparticles having a diameter of about 5-6 μm in about 10-90% by weight of said inorganic fillers,
microparticles having a diameter of 1-5 μm in about 20-100% by weight of said inorganic filler,
nanoparticles having a diameter of about 10-200 nm in about 1-10% by weight of said inorganic filler, and/or nanorods having a diameter of about 100 nm-1 μm and a length of about 1-10 μm in 1-10% by weight of said inorganic filler; and
wherein the nanoparticles and/or the nanorods fill gaps among the microparticles to form shortcuts, resulting in continuous, direct and multichannel dissipation pathways to facilitate heat dissipation;

wherein the surface of said inorganic filler is further modified by a dispersing agent comprising at least one of glycerin fatty acid esters or their polymers, organic silane coupling agents having hydrophilic groups and/or hydrophobic groups, organic titanates having hydrophilic groups and/or hydrophobic groups, thiol containing molecules with hydrophilic groups and/or hydrophobic groups, or a combination thereof for facilitating dispersing the inorganic filler into the polymer matrix, and wherein said dispersing agent is about 0.1-10% by weight of said inorganic filler;

wherein after modifying the surface of the inorganic filler and mixing the thermally and electrically conductive filler, the polymer matrix and the solvent to form the DAA composition with said modified filler formulation having different graded sizes of the modified filler, the fluidity of the fillers in the solvent is improved, enabling homogeneous dispersion of the filler to form the adhesive with high thermal conductivity;

wherein said polymer matrix is 2-30% by weight of the DAA composition; said solvent is 2-40% by weight of the DAA composition;

wherein said thermal conductivity is at least 40 W/M·K, and curing temperature of the DAA composition is about 80-100° C.; and wherein the dispersing agent is 3,3,4,4,5,5,6,6,7,7,8,8,9,9,10,10,10-heptadecafluoro-1-decanethiol.

12. The method of claim 11, wherein the inorganic filler is selected from gold, silver, copper, nickel, graphite, or a combination thereof.

13. The method of claim 11, wherein said polymer matrix consists of epoxy resin of 10-90% by weight and a curing agent of 10-90% by weight, and wherein said epoxy resin is one or more selected from chain aliphatic epoxy resin, cycloaliphatic epoxy resin, glycidyl ester, or glycidyl ether compounds; and said curing agent is one or more selected from amine, cationic polymerization catalysts, dicyandiamide, or modified imidazole group compound, phosphines, or metal salts.

14. The method of claim 11, wherein said solvent is one or more selected from toluene, xylene, propylene carbonate, mixed aliphatic dimethyl esters, diethylene glycol monomethyl ether acetate, dimethyl carbonate, diethylene carbonate, acetone, methyl ethyl ketone, methyl isobutyl ketone, ethanol, Isopropanol, n-butanol, or ethyl acetate.

15. The method of claim 11, wherein said mixing of the thermally and electrically conductive filler, the polymer matrix and the solvent is performed by hand mixing or one or more of mixing equipment selected from dough mixers, chain can mixers, planetary mixers, twin screw extruder, two or more roll mills, and wherein said providing additionally includes independently blending said thermally and electrically conductive filler, said polymer matrix, and said solvent in batch, continuous, or semi-continuous mode.

16. A one-part and heat curable die attach adhesive (DAA) composition formed by the method of claim 11.

* * * * *